US011708483B2

(12) United States Patent
Abubakar et al.

(10) Patent No.: US 11,708,483 B2
(45) Date of Patent: Jul. 25, 2023

(54) HEAT SEALABLE FILMS

(71) Applicant: ExxonMobil Chemical Patents Inc., Baytown, TX (US)

(72) Inventors: Saifudin M. Abubakar, Shanghai (CN); Jie Yu Jin, Shanghai (CN); Yong Xuan See, Singapore (SG)

(73) Assignee: ExxonMobil Chemical Patents Inc., Baytown, TX (US)

( * ) Notice: Subject to any disclaimer, the term of this patent is extended or adjusted under 35 U.S.C. 154(b) by 383 days.

(21) Appl. No.: 16/826,551

(22) Filed: Mar. 23, 2020

(65) Prior Publication Data

US 2020/0308383 A1 Oct. 1, 2020

Related U.S. Application Data

(60) Provisional application No. 62/827,222, filed on Apr. 1, 2019.

(51) Int. Cl.
| | |
|---|---|
| *C08L 23/12* | (2006.01) |
| *C08L 23/14* | (2006.01) |
| *B32B 27/08* | (2006.01) |
| *B32B 27/32* | (2006.01) |

(52) U.S. Cl.
CPC .............. *C08L 23/12* (2013.01); *B32B 27/08* (2013.01); *B32B 27/32* (2013.01); *C08L 23/14* (2013.01); *B32B 2307/31* (2013.01); *B32B 2307/516* (2013.01); *B32B 2307/518* (2013.01); *C08L 2203/162* (2013.01); *C08L 2205/02* (2013.01)

(58) Field of Classification Search
CPC .... B32B 2270/00; C08L 23/142; C08L 23/10; C08L 23/14
See application file for complete search history.

(56) References Cited

U.S. PATENT DOCUMENTS

| | | |
|---|---|---|
| 2007/0287007 A1 | 12/2007 | Williams et al. |
| 2012/0263960 A1 | 10/2012 | Song et al. |
| 2013/0177721 A1* | 7/2013 | Kadowaki .................. A61J 1/10 525/240 |
| 2020/0298541 A1* | 9/2020 | Wilkie ..................... B29C 55/02 |
| 2021/0155802 A1* | 5/2021 | Sun ........................ G02B 6/4494 |

* cited by examiner

*Primary Examiner* — Jeffrey C Mullis

(57) ABSTRACT

In an embodiment, a heat-seal film includes 10-90 wt % of a first polymer component and 10-90 wt % of a second polymer component, based on a total weight of the first polymer component and the second polymer component, wherein: the first polymer component includes propylene, and optionally, up to 18 wt % of a $C_2$ and/or a $C_4$-$C_{20}$ α-olefin based on a total weight of the first polymer component; and the second polymer component includes 91-99.9 wt % of propylene and 0.1-9 wt % of ethylene based on a total weight of the second polymer component, the second copolymer component having a melt flow rate of 2-60 g/10 min. In another embodiment, a multi-layer film structure includes a heat-seal layer including a heat-seal film described herein; and an unoriented, an uniaxially oriented, or a biaxially oriented base layer including polypropylene homopolymer, a polypropylene random copolymer, or a combination thereof.

18 Claims, 2 Drawing Sheets

HEAT SEALABLE FILMS

CROSS-REFERENCE TO RELATED APPLICATIONS

This application claims priority to U.S. Ser. No. 62/827,222, filed Apr. 1, 2019, herein incorporated by reference.

FIELD

This disclosure generally relates to heat sealable films.

BACKGROUND

Plastic films are used in a wide variety of packaging applications such as bags, pouches, tubes and trays. In many film applications it is desirable to seal the film during the packaging operation by using heat sealing techniques. For heat sealing purposes, it is important that the plastic film be readily heat sealable while also possessing other physical and mechanical properties such as resistance to tearing, high tensile strength, and suitable processability in high speed equipment.

Among these plastic films are cast polypropylene (cPP) films and biaxially oriented polypropylene (BOPP) films, which are widely used in both food packaging and non-food packaging, and terpolymer polypropylene (terPP), which is a commonly used polymer in the sealing layer of cPP and BOPP films. Conventional sealing layers (or films) having terPP target low seal initiation temperatures. Operating at low seal initiation temperatures is desired because, for example, it broadens the heat sealable range, permits higher productivity due to less time for cooling, requires less energy to heat seal, and exposes the packaged food/product to less heat. However, certain applications require an improved high sealing strength in addition to low, acceptable seal initiation temperatures (SITs).

There is a need for a sealing layer (or film) that can achieve higher sealing strength with low, acceptable SITs, broader hot tack window, and improved sealing hermeticity, each of which impact package integrity.

SUMMARY

In an embodiment, a heat-seal film is provided. The heat-seal film includes from 10 wt % to 90 wt % of a first polymer component and from 10 wt % to 90 wt % of a second polymer component, based on a total weight of the first polymer component and the second polymer component, wherein: the first polymer component includes propylene, and optionally, up to 18 wt % of a $C_2$ and/or a $C_4$-$C_{20}$ α-olefin based on a total weight of the first polymer component; and the second polymer component includes from 91 wt % to 99.9 wt % of propylene and from 0.1 wt % to 9 wt % of ethylene based on a total weight of the second polymer component, the second copolymer component having a melt flow rate (2.16 kg @ 230° C., ASTM D1238) of from 2 dg/min to 60 dg/min.

In another embodiment, a heat-seal film is provided. The heat-seal film includes from 50 wt % to 70 wt % of a first polymer component and from 30 wt % to 50 wt % of a second polymer component, based on a total weight of the first polymer component and the second polymer component, wherein: the first polymer component includes propylene, and optionally, up to 18 wt % of a $C_2$ and/or a $C_4$-$C_{20}$ α-olefin based on a total weight of the first polymer component; and the second polymer component includes from 91 wt % to 99.9 wt % of propylene and from 0.1 wt % to 9 wt % of ethylene based on a total weight of the second polymer component, the second copolymer component having: a melt flow rate (2.16 kg @ 230° C., ASTM D1238) of from 2 g/10 min to 60 g/10 min, a density of from 0.85 g/cm³ to 0.9 g/cm³ (23° C., ASTM D1505), and a weight average molecular weight of from 100,000 g/mol to 500,000 g/mol.

In another embodiment, a multi-layer film structure is provided. The multi-layer film structure includes a heat-seal layer including a heat-seal film described herein; and an unoriented, an uniaxially oriented, or a biaxially oriented base layer including polypropylene homopolymer, a polypropylene random copolymer, or a combination thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Figure 1A:
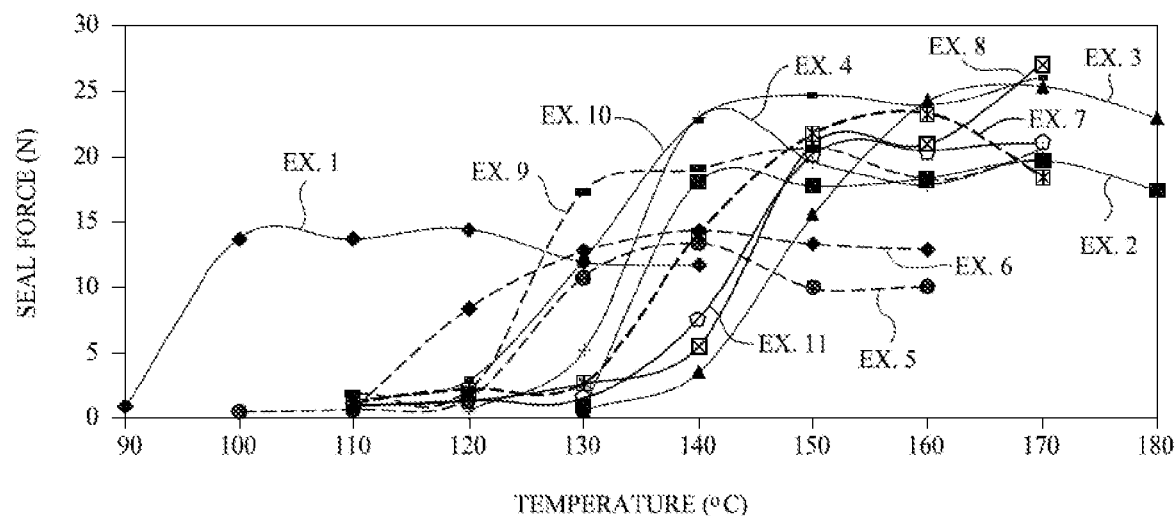
FIG. 1A is a graph illustrating the heat seal force for the example cast films according to some embodiments.
Figure 1B:
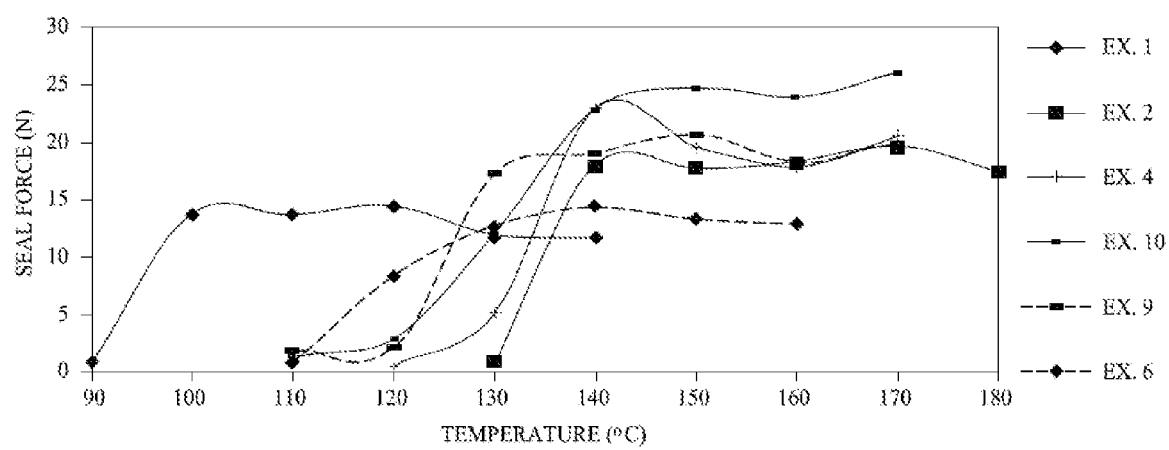
FIG. 1B is an enlarged view of a graph illustrating the heat seal force for the example cast films according to some embodiments.

The present disclosure relates to heat-seal films. Specifically, the disclosure relates to heat-seal films having high sealing strength and low, acceptable SITs, broader hot tack window, and improved sealing hermeticity, each of which impact package integrity. The heat sealable films employs blends that include propylene-based elastomers and polypropylene resins.

Many commonly used plastic materials that are used in the formation of film products could benefit from an improvement of their heat sealing characteristics. For example, crystalline polypropylene films have found extensive use in the field of packaging. Polypropylene films, in both oriented and non-oriented form, are used widely in packaging applications because of their superiority in mechanical properties such as tensile strength, rigidity, and surface hardness, optical properties such as gloss and transparency, and food hygiene such as freedom from toxicity and odor.

The inventors have discovered that a heat-seal film that includes (1) a propylene elastomer having certain properties (e.g., an ethylene content of less than 10 wt % based on the total weight of the propylene elastomer) and (2) one or more of a homopolymer polypropylene (hPP) and a random copolymer polypropylene (RCP) exhibits key film properties, e.g., a higher seal strength plateau relative to conventional sealing films, while at the same time having low, acceptable SITs, a broader hot tack window, and an improved sealing hermeticity. Thus, the heat-seal film overcomes the heat seal limitations of the conventional films mentioned above.

The heat-seal films disclosed herein generally include (a) from about 20 wt % to about 70 wt % of a first polymer component and (b) from about 30 wt % to about 80 wt % of a second polymer component.

In some embodiments, the heat-seal film is used in a multi-layer film structure. In the multi-layer film structure, the heat-seal film is referred to as an outer layer (or heat-seal layer). In some embodiments, the multi-layer film structure includes a base layer, which includes a thermoplastic polymer.

In various embodiments, and depending on the application, the heat-seal film and/or various layers in a multi-layer film structure include fillers and/or additives such as pigments, antioxidants, and cavitating agents.

First Polymer Component

The heat-seal film described herein includes a polypropylene, also referred to as the first polymer component. The first polymer component may be a propylene-α-olefin random copolymer (RCP), homopolymer polypropylene (hPP), a copolymer of propylene, a terpolymer of propylene, or a mixture thereof.

The first polymer component can be manufactured in any conventional manner using Ziegler-Natta or metallocene catalysts or any other suitable catalyst system.

In some embodiments, the first polymer component has a melting point that is about 105° C. or more, such as about 110° C. or more, such as about 115° C. or more, such as about 130° C. or more, such as about 165° C. or more.

In some embodiments, the first polymer component has a heat of fusion that is about 75 J/g or more.

In some embodiments, the first polymer component has a propylene content that is about 80 wt % or more, such as about 82 wt % or more, such as about 85 wt % or more, such as about 90 wt % or more, such as about 95 wt % or more, such as about 96 wt % or more, such as about 97 wt % or more, such as about 98 wt % or more, such as about 99 wt % or more, based on the total weight of the first polymer component. Suitable ranges of propylene content include from about 80 wt % to about 99.9 wt %, such as from about 82 wt % to about 99.9 wt %, such as from about 90 wt % to about 99.5 wt %, such as from about 96 wt % to about 99.5 wt %, such as from about 96 wt % to about 99 wt %, based on the total weight of the first polymer component.

In some embodiments, the first polymer component has a comonomer content that is about 20 wt % or less, such as about 18 wt % or less, such as about 15 wt % or less, such as about 10 wt % or less, such as about 5 wt % or less, such as about 4 wt % or less, such as about 3 wt % or less, such as about 2 wt % or less, such as about 1 wt % or less, such as about 0.5 wt % or less, such as about 0.1 wt % or less, based on the total weight of the first polymer component. Suitable ranges of comonomer include from about 0.1 wt % to about 20 wt %, such as from about 0.1 wt % to about 18 wt %, such as from about 0.5 wt % to about 10 wt %, such as from about 0.5 wt % to about 4 wt %, such as from about 1 wt % to about 4 wt %, based on the total weight of the first polymer component. Suitable α-olefin comonomers include ethylene ($C_2$) and $C_4$-$C_{20}$ α-olefins including, butene, pentene, hexene, and octene. The first polymer component may contain more than one different $C_2$ and/or $C_4$-$C_{20}$ α-olefin. If two different comonomers are present, the total wt % of comonomer can be higher, such as about twice the levels indicated above.

In some embodiments, the first polymer component has a melt flow rate (MFR) that is from about 1 g/10 min to about 30 g/10 min, such as from about 3 g/10 min to about 20 g/10 min, for example about 8 g/10 min or about 7 g/10 min MFR is measured according to ASTM
D1238 (2.16 kg @ 230° C.).

In some embodiments, the first polymer component has a weight average molecular weight of from about 10,000 g/mol to about 5,000,000 g/mol. The propylene-based elastomer may have a weight average molecular weight (Mw) of from about 5,000 g/mol to about 5,000,000 g/mol, or from about 10,000 g/mol to about 1,000,000 g/mol, or from about 50,000 g/mol to about 400,000 g/mol.

In some embodiments, the first polymer component has a molecular weight distribution (Mw/Mn) that is greater than about 1, such as from about 1.5 to about 40.

Second Polymer Component

The heat-seal film described herein further includes a propylene-α-olefin polymer, which may be a copolymer of propylene-derived units and one or more units derived from a $C_2$ and/or $C_4$-$C_{20}$ α-olefin, and optionally one or more diene-derived units. Examples of α-olefins include ethylene, butene, pentene, hexene, and octene. This polymer is also referred to herein as the second polymer component.

In some embodiments, the second polymer component has a propylene content that is greater than about 50 wt %, such as greater than about 60 wt %, such as greater than about 65 wt %, such as greater than about 75 wt % and up to about 99 wt %, based on the total weight of the second polymer component. In some embodiments, the propylene content is about 91 wt % or more, such as about 92 wt % or more, such as about 93 wt % or more, such as about 94 wt % or more, such as about 95 wt % or more, such as about 96 wt % or more, such as about 97 wt % or more, such as about 98 wt % or more, such as about 99 wt % or more, based on the total weight of the second polymer component. Suitable ranges of propylene content include from about 91 wt % to about 99.9 wt %, such as from about 91 wt % to about 99.5 wt %, such as from about 91 wt % to about 99 wt %, such as from about 92 wt % to about 98 wt %, such as from about 93 wt % to about 97 wt %, such as from about 94 wt % to about 96 wt %, based on the total weight of the second polymer component.

In some embodiments, the second polymer component has a comonomer content that is about 9 wt % or less, such as about 8 wt % or less, such as about 7 wt % or less, such as about 6 wt % or less, such as about 5 wt % or less, such as about 4 wt % or less, such as about 3 wt % or less, such as about 2 wt % or less, such as about 1 wt % or less, such as about 0.5 wt % or less, such as about 0.1 wt % or less, based on the total weight of the second polymer component. Suitable ranges of comonomer include from about 0.1 wt % to about 9 wt %, such as from about 0.5 wt % to about 9 wt %, such as from about 1 wt % to about 9 wt %, such as from about 2 wt % to about 9 wt %, such as from about 3 wt % to about 9 wt %, such as from about 4 wt % to about 9 wt % comonomer, such as from about 5 wt % to about 9 wt %, such as from about 6 wt % to about 9 wt %, such as from about 7 wt % to about 9 wt %, such as from about 8 wt % to about 9 wt %, based on the total weight of the second polymer component. Suitable α-olefin comonomers include ethylene ($C_2$) and $C_4$-$C_{20}$ α-olefins including, butene, pentene, hexene, and octene. The second polymer component may contain more than one different $C_2$ and/or $C_4$-$C_{20}$ α-olefin. If two different comonomers are present, the total weight % of comonomer can be higher, such as about twice the levels indicated above. For example, the amount of a particular comonomer may be less than about 5 wt %, but the combined comonomer content is greater than about 5 wt %. Particular embodiments of polymers having more than one α-olefin include propylene-ethylene-octene, propylene-ethylene-hexene and propylene-ethylene-butene polymers. These polymers may further include a diene as described below.

In some embodiments, the second polymer component includes more than one comonomer. In some embodiments the second polymer component has more than one comonomer including propylene-ethylene-octene, propylene-ethylene-hexene, and propylene-ethylene-butene copolymers. In embodiments where more than one comonomers derived from at least one of ethylene or a $C_4$ to $C_{10}$ α-olefins are present, the amount of each comonomer may be less than about 5 wt % of the second polymer component, but the combined amount of comonomers by weight of the second polymer component is about 5 wt % or greater. In some embodiments, the comonomer is ethylene, 1-hexene, or 1-octene, and in an amount of, e.g., from about 5 wt %, or about 1 wt %, or 14 wt % to about 22 wt %, or about 25 wt % based on the weight of the second polymer component.

In some embodiments, the second polymer component includes ethylene-derived units. In some embodiments, the second polymer component includes, e.g., from about 5 wt %, or about 10 wt %, or about 14 wt % to about 22 wt %, or about 25 wt % of ethylene-derived units by weight of the second polymer component. According to some embodiments, the second polymer component consists essentially of units derived from propylene and ethylene, i.e., the second polymer component does not contain any other comonomer in an amount typically present as impurities in the ethylene and/or propylene feedstreams used during polymerization or an amount that would materially affect the heat of fusion, melting point, crystallinity, or melt flow rate of the second polymer component, or any other comonomer intentionally added to the polymerization process.

In some embodiments, diene comonomer units are included in the second polymer component. Examples of the diene include, but not limited to, 5-ethylidene-2-norbornene, 5-vinyl-2-norbornene, divinylbenzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. In these embodiments, the amount of diene comonomer is equal to or more than about 0 wt %, or about 0.5 wt %, or about 1 wt %, or about 1.5 wt % and lower than, or equal to, about 5 wt %, or about 4 wt %, or about 3 wt % or about 2 wt % based on the weight of second polymer component.

In some embodiments, the comonomer content is adjusted so that the second polymer component has a heat of fusion of about 100 J/g or less, or about 75 J/g or less, a melting point ($T_m$) of about 100° C. or about 90° C. or less, and crystallinity of about 2% to about 65% of isotactic polypropylene, and a melt flow rate ("MFR"), as measured at 230° C. and 2.16 kg weight, of less than about 800 g/10 min.

In some embodiments, the propylene-derived units of the second polymer component have an isotactic triad fraction of about 50% to about 99%, such as from about 65% to about 97%, such as from about 75% to about 97%. In other embodiments, the first polymer has a triad tacticity as measured by $^{13}$C NMR, of about 75% or greater, about 80% or greater, about 82% or greater, about 85% or greater, or about 90% or greater. The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the first polymer.

The triad tacticity (mm fraction) of a second polymer component can be determined from a $^{13}$C NMR spectrum of the second polymer component. The calculation of the triad tacticity is described in the U.S. Pat. No. 5,504,172, the entire contents of which are incorporated herein by reference.

In some embodiments, the second polymer component has a melt flow rate ("MFR") greater than about 0.5 g/10 min, and less than or equal to about 1,000 g/10 min, or less than or equal to about 800 g/10 min, such as less than or equal to about 500 g/10 min, such as less than or equal to about 200 g/10 min, such as less than or equal to about 100 g/10 min, such as less than or equal to about 50 g/10 min. In some embodiments, the second polymer component has an MFR of less than or equal to about 25 g/10 min, such as from about 1 g/10 min to about 25 g/10 min, such as from about 1 g/10 min to about 20 g/10 min, such as from about 1 g/min to about 10 g/min, such as from about 2 g/min to 9 g/min, such as from about 3 g/min to about 7 g/min, such as 4 g/min to about 6 g/min. In various embodiments, the second polymer component has a melt flow rate of from about 2 g/min to about 60 g/min, such as from about 8 g/min to about 60 g/min, for example about 8 g/min. The MFR is determined according to ASTM D-1238, condition L (2.16 kg, 230° C.).

In some embodiments, the second polymer component has a peak melting transition as determined by DSC that is about 120° C. or less, such as about 115° C. or less, such as about 110° C. or less. In some embodiments, the Tm is from about 25° C. to about 120° C., such as from about 25° C. to about 115° C., such as from about 25° C. to about 110° C., such as from about 25° C. to about 80° C., such as from 25° C. to about 75° C., such as from about 25° C. to about 65° C., such as from about 30° C. to about 80° C., such as from about 30° C. to about 70° C., such as from about 30° C. to about 60° C. In some embodiments, the melting transition is a single broad melting transition. The Tm is measured by the differential scanning calorimetry (DSC) procedure (ASTM D3418). In some embodiments, the melting transition is a single broad melting transition. The melting point is defined as the temperature of the greatest heat absorption within the range of melting of the sample. However, the second polymer component may show secondary melting peaks adjacent to the principal peak, but for purposes herein, such secondary melting peaks are considered together as a single melting point, with the highest of these peaks being considered the melting point of the second polymer component.

For the thermal properties of the second polymer component s, Differential Scanning calorimetry ("DSC") was used. Such DSC data was obtained using a Perkin-Elmer DSC 7.5 mg to 10 mg of a sheet of the polymer to be tested was pressed at approximately 200° C. to 230° C., then removed with a punch die and annealed at room temperature for 48 hours. The samples were then sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity. The percent crystallinity (X %) was calculated using the formula, X %=[area under the curve (Joules/gram)/B(Joules/gram)]*100, where B is the heat of fusion for the homopolymer of the major monomer component. These values for B were found from the Polymer Handbook, Fourth Edition, published by John Wiley and Sons, New York 1999. A value of 189 J/g (B) was used as the heat of fusion for 100% crystalline polypropylene. The melting temperature was measured and reported during the second heating cycle (or second melt).

In some embodiments, the second polymer component has a density of from about 0.85 g/cm$^3$ to about 0.92 g/cm$^3$, such as from about 0.85 g/cm$^3$ to about 0.9 g/cm$^3$, such as from about 0.86 g/cm$^3$ to about 0.90 g/cm$^3$, such as from about 0.860 g/cm$^3$ to about 0.890 g/cm$^3$, such as from about 0.87 g/cm$^3$ to about 0.89 g/cm$^3$, such as from about 0.875 g/cm$^3$ to about 0.89 g/cm$^3$, for example about 0.875 g/cm$^3$, or about 0.88 g/cm$^3$, or about 0.89 g/cm$^3$ as measured per ASTM D-1505.

In some embodiments, the second polymer component has a durometer hardness (Shore) of from 70 Shore D to about 60 Shore A. In some embodiments, the second polymer component has a durometer hardness (Shore) of from about 20 D to about 70 D, such as from about 20 D to about 60 D, such as from about 40 D to about 55 D, for example about 40 D or about 52 D. Shore hardness is measured according to ASTM D2240.

In some embodiments, the second polymer component has a tensile strength at break that is greater than about 10 MPa, such as from about 17 MPa to about 40 MPa, such as from about 17.2 MPa to about 40 MPa, such as from about 20 MPa to about 40 MPa, such as from about 25 MPa to about 40 MPa, such as from about 25.1 MPa to about 40 MPa. In some embodiments, the tensile strength at break is 17.2 MPa (about 2500 psi) or about 25.1 MPa (about 3644 psi). The tensile strength at break is determined according to ASTM D638.

In some embodiments, the second polymer component has an elongation at break that is about 2000% or less, such as about 1750% or less, such as about 1700% or less. In some embodiments, the elongation at break is about 100% to about 1700%, such as about 600% to about 1700%, for example about 617% or about >1682%. The elongation at break is determined according to ASTM D638.

In some embodiments, the second polymer component has a 1% secant flexural modulus (at break) that is from about 60 MPa or more, such as from about 60 MPa to about 500 MPa, such as from about 70 MPa to about 500 MPa, such as from about 80 MPa to about 500 MPa, such as from about 90 MPa to about 500 MPa, such as from about 100 MPa to about 500 MPa (for example about 110 MPa), such as from about 110 MPa to about 500 MPa, such as from about 120 MPa to about 500 MPa, such as from about 150 MPa to about 500 MPa, such as from about 200 MPa to about 450 MPa, such as from about 300 MPa to about 400 MPa, such as from about 350 MPa to about 400 MPa, for example about 394 MPa. The 1% secant flexural modulus (at break) is determined according to ASTM D790.

In some embodiments, the second polymer component has a tear strength (die C) that is greater than about 60 N/mm, such as from about 60 N/mm to about 200 N/mm, such as from about 70 N/mm to about 150 N/mm, such as from about 80 N/mm to about 130 N/mm, for example about 81 N/mm or about 125 N/mm. The tear strength (die C) is determined according to ASTM D624.

In some embodiments, the second polymer component has a vicat softening point (200 g) that is about 68° C. or more, such as from about 70° C. to about 120° C., such as from about 75° C. to about 110° C., for example about 77° C. or about 103° C. The vicat softening point is determined according to ASTM D1525.

In some embodiments, the second polymer component has an intermolecular composition distribution that is about 75% or more, such as about 80% or more, such as about 85% or more, such as about 90% or more by weight of the polymer isolated as one or two adjacent, soluble fractions with the balance of the polymer in immediately preceding or succeeding fractions; and wherein each of these fractions has a wt % comonomer content with a difference of no greater than about 20 wt % (relative), such as about 10 wt % (relative), of the average wt % comonomer of the copolymer. The fractions are obtained at temperature increases of approximately 8° C. between stages. The intermolecular composition distribution of the copolymer is determined by thermal fractionation in hexane as described in WO 2006/065648, page 14, et seq.

In some embodiments, the second polymer component has a weight average molecular weight ("Mw") of from about 5,000 g/mol to about 5,000,000 g/mol, such as from about 10,000 g/mol to about 1,000,000 g/mol, such as from about 50,000 g/mol to about 400,000 g/mol or from about 100,000 g/mol to about 500,000 g/mol.

In some embodiments, the second polymer component has a number average molecular weight ("Mn") of from about 2,500 g/mol to about 2,500.00 g/mol, such as from about 10,000 g/mol to about 250,000 g/mol, such as from about 25,000 g/mol to about 200,000 g/mol.

In some embodiments, the second polymer component has a z-average molecular weight ("Mz") of from about 10,000 g/mol to about 7,000,000 g/mol, such as from about 80,000 g/mol to about 700,000 g/mol, such as from about 100,000 g/mol to about 500,000 g/mol.

In some embodiments, the second polymer component has a molecular weight distribution (Mw/Mn, or "MWD") that is from about 1 to about 40, such as from about 1 to about 5, such as from about 1.8 to about 5, such as from about 1.8 to about 3, such as from about 1.5 to about 3.

In some embodiments, the second polymer component has a heat of fusion ("$H_f$"), as determined by DSC, of about 100 J/g or less, or about 75 J/g or less, about 70 J/g or less, about 50 J/g or less, or about 35 J/g or less. The second polymer component may have a lower limit $H_f$ of about 0.5 J/g, about 1 J/g, or about 5 J/g. For example, the $H_f$ value may be anywhere from about 1.0 J/g, about 1.5 J/g, about 3.0 J/g, about 4.0 J/g, about 6.0 J/g, or about 7.0 J/g, to about 30 J/g, about 35 J/g, about 40 J/g, about 50 J/g, about 60 J/g, about J/g 70, or about 75 J/g.

In some embodiments, the second polymer component has a percent crystallinity, as determined according to the DSC procedure described herein, of from about 2% to about 65%, such as from about 0.5% to about 40%, such as from about 1% to about 30%, such as from 5% to 35%, of isotactic polypropylene. The thermal energy for the highest order of propylene (i.e., 100% crystallinity) is estimated at about 189 J/g. In any embodiment, the second polymer component has a crystallinity in the range of from about 0.25% to about 25%, such as from about 0.5% to about 22% of isotactic polypropylene.

In one or more embodiments, the second polymer component has a Mooney viscosity [ML (1+4) @ 125° C.], as determined according to ASTM D-1646, of less than about 100, in other embodiments less than about 75, in other embodiments less than about 60, and in other embodiments less than 30.

In some embodiments, the comonomer content is adjusted so that the polymer has a MWD of from about 1 to about 5, a heat of fusion of about 75 J/g or less, and a melting point of about 105° C. or less.

Commercial examples of such second polymer components includes Vistamaxx™ second polymer components from ExxonMobil Chemical Company, Tafmer™ elastomers from Mitsui Chemicals, Versify™ elastomers from Dow Chemical Company, and certain grades of Softel™ from Basell Polyolefins, Netherlands.

Vistamaxx™ 3588 and Vistamaxx™ 3980 are commercially available from ExxonMobil Chemical Co. Certain properties of Vistamaxx™ 3588 and Vistamaxx™ 3980 are shown in Table A.

TABLE A

| Properties | Vistamaxx ™ 3588 | Vistamaxx ™ 3980 |
|---|---|---|
| Ethylene Content | 4 wt % | 9 wt % |
| Density | 0.889 g/cm$^3$ | 0.879 g/cm$^3$ |
| MFR (230° C., 2.16 kg) | 8 g/10 min | 8 g/10 min |
| Durometer Hardness (Shore D/A) | 52D | 40D |
| Tensile Strength at Break | 25.1 MPa | 17.2 MPa |
| Elongation at Break | 617% | 1682% |
| 1% Secant Flexural Modulus | 394 MPa | 111 MPa |
| Tear Strength (Die C) | 125 N/m | 81 N/m |
| Vicat Softening Temperature | 103° C. | 77° C. |

Approximate values for properties of the propylene elastomers.

Example Heat-Seal Film Combinations

As described above, the heat-seal film includes a first polymer component and second polymer component.

In various embodiments, the first polymer component is present in the heat-seal film in an amount of from about 10 wt % to about 90 wt %, such as from about 20 wt % to about 70 wt %, such as from about 30 wt % to about 70 wt %, such as from about 40 wt % to about 98 wt %, such as from about 50 wt % to about 70 wt %, such as from about 60 wt % to about 70 wt %, based on the total weight of the first polymer component and the second polymer component.

In various embodiments, the second polymer component is present in the heat-seal film in an amount of from about 10 wt % to about 90 wt %, such as from about 30 wt % to about 80 wt %, such as from about 30 wt % to about 70 wt %, such as from about 30 wt % to about 60 wt %, such as from about 30 wt % to about 50 wt %, such as from about 30 wt % to about 40 wt %, based on the total weight of the first polymer component and the second polymer component.

In some embodiments, the heat-seal film has a seal initiation temperature that is 135° C. or less, such as 130° C. or less, such as 125° C. or less, such as 120° C. or less, such as 115° C. or less.

In some embodiments, the heat-seal film has a peak melting point (peak Tm) that is about 200° C. or less, such as about 180° C. or less, such as about 170° C. or less, such as about 165° C. or less. In some embodiments, the peak Tm is from about 25° C. to about 200° C., such as from about 25° C. to about 180° C., such as from about 25° C. to about 170° C., such as from about 50° C. to about 170° C., such as from about 70° C. to about 170° C., such as from about 90° C. to about 170° C., such as from about 100° C. to about 170° C., such as from about 110° C. to about 170° C., such as from about 120° C. to about 170° C., such as from about 130° C. to about 170° C., such as from about 140° C. to about 170° C., such as from about 150° C. to about 170° C., such as from about 160° C. to about 170° C. The peak Tm is measured by the DSC procedure disclosed herein. In some embodiments, the melting transition is a single broad melting transition. The melting point is defined as the temperature of the greatest heat absorption within the range of melting of the sample. However, the heat-seal film may show secondary melting peaks adjacent to the principal peak, but for purposes herein, such secondary melting peaks are considered together as a single melting point, with the highest of these peaks being considered the melting point of the heat-seal film.

In some embodiments, the heat-seal film has an onset melting point (onset Tm) that is about 200° C. or less, such as about 180° C. or less, such as about 170° C. or less, such as about 165° C. or less. In some embodiments, the peak Tm is from about 25° C. to about 160° C., such as from about 25° C. to about 150° C., such as from about 50° C. to about 150° C., such as from about 60° C. to about 150° C., such as from about 70° C. to about 150° C., such as from about 90° C. to about 150° C., such as from about 100° C. to about 150° C., such as from about 110° C. to about 150° C., such as from about 120° C. to about 150° C., such as from about 130° C. to about 150° C., such as from about 140° C. to about 150° C.

In some embodiments, the heat-seal film has a seal initiation temperature that is from about 7° C. to about 10° C. lower than a 100% terPP formulation, at a seal force of 10N.

In some embodiments, the heat-seal film has a seal strength plateau that is from about 5% to about 37% higher than a 100% terPP formulation; and In some embodiments, the heat-seal film has a hot tack window (ASTM F1921) that is from about 28% to about 84% larger than a 100% terPP formulation at a seal force of 5N.

Example compositions of heat-seal films and measured properties of those heat-seal films are described below.

The heat-seal film may include additional thermoplastic polymers and/or polyolefins, and/or any fillers/additives as described below.

Base Layer

In some embodiments, the heat-seal film (or heat-seal layer) can be combined with a base layer to form a multi-layer film structure. The base layer of the multi-layer film structure includes a polymeric matrix including a film-forming thermoplastic polymer. A polyolefin having a melting point, e.g., of from about 140° C. to about 167° C., represents one example of a suitable film-forming polymer for forming the polymeric matrix of the base layer. In some embodiments, if the film-forming polymer of the base layer is a polyolefin, the polyolefin has a relatively high degree of crystallinity.

In some embodiments, the polyolefin used as the film-forming polymer of the base layer is an isotactic propylene homopolymer having one or more of the following characteristics (1) An isotacticity that is from about 80% to about 99%.

(2) A melting point that is from about 155° C. to about 165° C. (as measured according to DSC procedures provided herein).

(3) A melt flow that is from about 0.5 g/10 min to about 15 g/10 min (as measured according to ASTM D1238).

The isotactic propylene polymer may be produced by using Ziegler-Natta or metallocene catalysts. Metallocene-catalyzed isotactic polypropylenes made developmentally or commercially include EOD 96-21 and EOD 97-09, from Atofina Petrochemicals, Inc., and EXPP-129, from ExxonMobil Chemical Co. Other suitable commercially available materials include Amoco 9117 and Amoco 9119 (available from Amoco Chemical Co. of Chicago, Ill.), and Chisso HF5010 and Chisso XF2805 (available from Chisso Chemical Co., Ltd. of Tokyo, Japan).

Other suitable film-forming polymers that may be used to form the polymeric matrix of the base layer include syndiotactic polypropylene, ethylene-propylene copolymers, ethylene-propylene-butene-1 terpolymers, butylene-ethylene copolymers, functionally grafted copolymers, and blends of polymers.

In some embodiments, the base layer includes a polymeric matrix which includes any of the propylene homopolymers, copolymers, or terpolymers described above. In other embodiments, the polymeric matrix of the base layer includes an ethylene resin, such as a high density polyethylene (HDPE), medium density polyethylene (MDPE), low density polyethylene (LDPE), very low density polyethylene (VLDPE), or linear low density polyethylene (LLDPE).

HDPE is a substantially linear polyolefin having a density of, for example, from about 0.95 g/cm$^3$ or higher, e.g., from about 0.952 g/cm$^3$ to about 0.970 g/cm$^3$, and a melting point of, e.g., from about 266° F. to about 299° F. (from about 130° C. to about 148° C.). MDPE has a density in the range of from about 0.926 g/cm$^3$ to about 0.940 g/cm$^3$. LDPE typically has a density in the range of from about 0.90 g/cm$^3$ to about 0.94 g/cm$^3$, e.g., from 0.910 g/cm$^3$ to about 0.926 g/cm$^3$, and a melt index of from less than about 1 g/10 min (such as 0.1 g/10 min) to about 10 g/10 min (as measured according to ASTM D1238). LDPE may be derived solely from ethylene, e.g., in a high pressure, peroxide-catalyzed reaction, or from ethylene together with a comonomer, including higher olefin comonomers containing 4 to 10 carbon atoms, e.g., butene-1, hexene-1, or octene-1, e.g., in a gas phase linear low density polyethylene (LLDPE) process or in a solution LLDPE process using Ziegler-Natta, metallocene, or single-site catalysts.

LLDPE typically has a melt index of from less than about 0.2 g/10 min to about 10 g/10 min (as measured according to ASTM D1238), and a density in the range of from about 0.88 g/cm$^3$ to 0.94 g/cm$^3$, such as from about 0.89 g/cm$^3$ to about 0.92 g/cm$^3$. It may be derived from ethylene together with other higher comonomers, such as butene-1, hexene-1 or octene-1. VLDPE, which is sometimes referred to as ultra-low density polyethylene (ULDPE), is a very low density polyethylene typically having a density at or below 0.915 g/cm$^3$, e.g., from about 0.86 to about 0.915 g/cm$^3$. VLDPE is typically produced in a high pressure, peroxide-catalyzed reaction or in a solution process. When produced using a metallocene or single-site catalyst, VLDPE is commonly referred to as a type of plastomer.

The film formed from the base layer may be unoriented, uniaxially oriented, or biaxially oriented. If it is desired to produce an opaque film structure, a cavitating agent(s) can be dispersed within the polymeric matrix of the base layer before extrusion and orientation. A suitable cavitating agent(s) includes any organic or inorganic material that has limited miscibility with, and has a higher melting point than, the polymer matrix of the base layer, at least at the orientation temperature. For example, the cavitating agent(s) may be any of those described in U.S. Pat. Nos. 4,377,616 and 4,632,869, the entire disclosures of which are incorporated herein by reference. Specific examples of the cavitating agent(s) include polybutylene terephthalate (PBT), nylon, an acrylic resin, an ethylene-norbornene copolymer, solid or hollow preformed glass spheres, metal beads or spheres, ceramic spheres, calcium carbonate, and combinations thereof. When the base layer including a cavitating agent(s) is subjected to uniaxial or biaxial orientation, a cavity forms, providing a film having an opaque appearance.

The particle size of the cavitating agent(s) may be, for example, from about 0.1 μm to about 10 μm, such as from about 0.2 μm to about 2 μm. The cavitating agent(s) may be of any desired shape. For example, the cavitating agent(s) may be substantially spherical. The cavitating agent(s) may be present in the base layer in an amount of less than about 30 wt %, for example from about 2 wt % to about 20 wt %, such as from about 5 wt % to about 10 wt %, based on the total weight of the base layer.

The cavitating agent(s) may be dispersed within the polymeric matrix of the base layer by blending the cavitating agent(s) and the film-forming polymer that provides the polymeric matrix at a temperature above the melting point of the film-forming polymer. This blending may take place in an extruder, such as a co-rotating, intermeshing twin screw extruder.

To preserve the structural integrity of the base layer, a thin layer of the film-forming polymer of the base layer, without the cavitating agent(s), may be coextruded on one or both sides of the film-forming polymer of the base layer. In this case, the total of the cavitating agent(s)-containing layer and the non-cavitating agent(s)-containing layer(s) may be considered the overall base layer of the film.

The base layer may also include an opacifying agent(s). Examples of the opacifying agent(s) include iron oxide, carbon black, titanium dioxide, talc, and combinations thereof. The opacifying agent(s) may be present in the base layer in an amount of from about 1 wt % to about 15 wt %, such as from about 1 wt % to about 8 wt %, such as from about 2 wt % to about 4 wt %, based on the total weight of the base layer. Aluminum is another example of an opacifying agent that may be used in the base layer of the present film structure. Aluminum may be included in the base layer as an opacifying agent in an amount of from about 0.01 wt % to about 1.0 wt %, such as from about 0.25 wt % to about 0.85 wt %, based on the total weight of the base layer.

The base layer may further include one or more hydrocarbon resins. The hydrocarbon resin(s) may be present in the base layer in a total amount of from about 1 wt % to about 15 wt %, such as from about 1 wt % to 12 wt %, or from about 2 wt % to 6 wt %, based on the total weight of the base layer.

The hydrocarbon resin(s) may be a low molecular weight hydrocarbon which is compatible with the film-forming polymer of the base layer. The hydrocarbon resin(s) may, optionally, be hydrogenated. The hydrocarbon resin(s) may have a number average molecular weight of less than about 5,000 g/mol, for example less than about 2,000 g/mol, such as from about 500 g/mol to about 1,000 g/mol. The resin(s) may be natural or synthetic and may have a softening point in the range of from about 60° C. to about 180° C. A specific example of a hydrocarbon resin that may be contained in the base layer is any of the hydrocarbon resins disclosed in U.S. Pat. No. 5,667,902, which is incorporated herein by reference. Specific examples include petroleum resins, terpene resins, styrene resins, and cyclopentadiene resins. Examples of commercially available hydrogenated resins include Piccolyte™ available from Pinova, Inc., Regalrez™ available from Eastman Co., Regalite™ available from Eastman Co., Escorez™ available from ExxonMobil Chemical Co.

A saturated alicyclic resin is an additional example of a hydrocarbon resin that may be included in the base layer. Saturated alicyclic resins have a softening point in the range of from about 85° C. to about 140° C., for example from about 100° C. to about 140° C., as measured by the ring and ball technique. An example of a commercially available saturated alicyclic resin is ARKON-P, available from Arakawa.

The base layer of the multi-layer film structure is of sufficient thickness to provide bulk properties, such as barrier and stiffness, that are desired for product protection and good performance on packaging equipment. In some embodiments, the thickness of the base layer is from about 50% to about 99% of the entire thickness of the multi-layer film structure.

The multi-layer film structure includes at least one heat-seal layer including the seal-layer blends described above.

In various embodiments, the multi-layer film structure is prepared so that a heat-seal layer is provided directly on one side of the base layer. In other embodiments, the multi-layer film structure is prepared so that one or more intermediate, or tie, layers are between the base layer and heat-seal layer. In these and other embodiments, the multi-layer film structure is prepared with one or more additional layers on the side of the base layer opposite the side of the heat-seal layer.

For example, the multi-layer film structure may be represented, in simplified form, as having a structure "AC", "ACE", "ABCE", "ACDE", or "ABCDE", wherein "C" represents a base layer, "B" and "D" represent intermediate layers adjacent to the base layer, "A" represents a heat-seal layer according to the present disclosure, which is either adjacent to the base layer "C" or adjacent to the outer surface of layer "B", and "E" represents a skin layer, which is either adjacent to the base layer "C" or adjacent to the outer surface of layer "D". Layers "A" and "B" may be the same or different, layers "D" and "E" may be the same or different, layers "B" and "D" may be the same or different, and layers "A" and "E" may be the same or different. In some embodiments, layers "A" and "C" are different. Additionally, structures containing more than five layers are contemplated, e.g., six, seven, eight, nine, or more layers.

In some embodiments, the skin layer on the side of the base layer opposite the heat-seal layer is either adjacent to the base layer or separated from the base layer by one or more intermediate layers. The skin layer may include a polymeric matrix including any of the film-forming polymers. Suitable film-forming polymers that may be used to form the polymeric matrix of the skin layer include syndiotactic polypropylene, low density polyethylene (LDPE), linear low density polyethylene (LLDPE), medium density polyethylene (MDPE), high density polyethylene (HDPE), ethylene-vinyl acetate copolymers, ethylene-vinyl alcohol copolymers, nylons, polymers grafted with functional groups, and/or blends of any of these.

The intermediate layer(s) that is optionally provided between the base layer and the heat-seal layer and/or the base layer and the skin layer also includes a polymeric matrix including any of the film-forming polymers. Suitable film-forming polymers for forming the polymeric matrix of the intermediate layer(s) include any of the film-forming polymers disclosed above with reference to the skin layer.

Alternately, the outer surface of the present film structures opposite the heat-seal layer may have applied thereto a substrate, such as another polymer film or laminate, a cellulosic web(s), e.g., numerous varieties of paper, such as corrugated paperboard, craft paper, glassine, and cartonboard, nonwoven tissue, e.g., spunbonded polyolefin fiber and melt-blown microfibers. The application may employ a suitable adhesive, e.g., a hot melt adhesive, such as low density polyethylene, ethylene-methacrylate copolymer, a water-based adhesive, such as polyvinylidene chloride latex.

Additives

In some embodiments, additives are present in the heat-seal film and/or one or more layers of the multi-layer films structures of this disclosure. Such additives include opacifying agents, pigments, colorants, cavitating agents, slip agents, antioxidants, anti-fog agents, anti-static agents, anti-block agents, fillers, moisture barrier additives, gas barrier additives, and combinations thereof. These additives may be used in effective amounts, which vary depending on the property required.

Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. Cavitation may also be introduced by beta-cavitation, which includes creating beta-form crystals of polypropylene and converting at least some of the beta-crystals to alpha-form polypropylene crystals and creating a small void remaining after the conversion. Beta-cavitated embodiments of the core layer may also include a beta-crystalline nucleating agent. Substantially any beta-crystalline nucleating agent ("beta nucleating agent" or "beta nucleator") may be used. The average diameter of the void-initiating particles typically may be from about 0.1 to about 10 μm.

Slip agents may include higher aliphatic acid amides, higher aliphatic acid esters, waxes, silicone oils, and metal soaps. Such slip agents may be used in amounts ranging from about 0.1 wt % to about 2 wt % based on the total weight of the layer to which it is added. An example of a slip additive is erucamide.

Non-migratory slip agents, if used in one or more skin layers of the multi-layer films, include polymethyl methacrylate (PMMA) or silicone oil. The non-migratory slip agent may have a mean particle size in the range of from about 0.5 μm to about 8 μm, or from about 1 μm to about 5 μm, or from about 2 μm to about 4 μm, depending on layer thickness and desired slip properties. Alternately, the size of the particles in the non-migratory slip agent, such as PMMA, is about 20% or more of the thickness of the skin layer containing the slip agent, or about 40% or more of the thickness of the skin layer, or about 50% or more of the thickness of the skin layer. The size of the particles of such non-migratory slip agent may also be at least about 10% greater than the thickness of the skin layer, or at least about 20% greater than the thickness of the skin layer, or at least about 40% greater than the thickness of the skin layer. Generally spherical, particulate non-migratory slip agents are contemplated, including PMMA resins, such as Epostar™ (commercially available from Nippon Shokubai Co., Ltd. of Japan). Other commercial sources of suitable materials are also known to exist. Non-migratory refers to these particulates do not generally change location throughout the layers of the film in the manner of the migratory slip agents. A conventional polydialkyl siloxane, such as silicone oil or gum additive having a viscosity of from about 10,000 centistokes to about 2,000,000 centistokes, is also contemplated.

Suitable anti-oxidants may include phenolic anti-oxidants, such as Irganox™ 1010 (commercially available from Sigma Aldrich). If present, such an anti-oxidant is generally used in amounts ranging from about 0.1 wt % to about 2 wt %, based on the total weight of the layer(s) to which it is added.

Examples of anti-static agents include alkali metal sulfonates, polyether-modified polydiorganosiloxanes, polyalkylphenylsiloxanes, and tertiary amines. If present, such anti-static agents may be used in amounts ranging from about 0.05 wt % to about 3 wt %, based on the total weight of the layer(s).

Examples of suitable anti-blocking agents include silica-based products such as Sylobloc™ 44 (commercially available from Grace Davison Products of Colombia, Md.), PMMA particles such as Epostar™ (commercially available from Nippon Shokubai Co., Ltd. of Japan), or polysiloxanes such as Tospearl™ (commercially available from Momentive). If present, such an anti-blocking agent includes an effective amount up to about 3000 ppm of the weight of the layer(s) to which it is added.

Examples of fillers include finely divided inorganic solid materials such as silica, fumed silica, diatomaceous earth, calcium carbonate, calcium silicate, aluminum silicate, kaolin, talc, bentonite, clay, and pulp.

Examples of suitable moisture and gas barrier additives may include effective amounts of low-molecular weight resins, hydrocarbon resins, particularly petroleum resins, styrene resins, cyclopentadiene resins, and terpene resins.

Optionally, one or more skin layers is compounded with a wax or coated with a wax-containing coating, for lubricity, in amounts ranging from about 2 wt % to about 15 wt % based on the total weight of the skin layer. Any conventional wax, such as carnauba wax (commercially available from Michelman Corporation of Cincinnati, Ohio), that is useful in thermoplastic films is contemplated.

Film Orientation

The embodiments of this disclosure may include uniaxially, biaxially, and non-oriented multi-layer films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending on the desired film features. In some embodiments, orientation ratios are from about three to about six times in the machine direction and from about four to about ten times in the transverse direction. Typical commercial orientation processes are biaxially oriented polypropylene (BOPP) tenter process, blown film, and LISIM technology. Blown and LISIM processes are particularly well-adapted to fully exploit the low sealing potential of sealant layer formulations discussed in this patent.

Surface Treatment

In embodiments where the heat-seal film is combined with the base layer in, e.g., a multi-layer film structure, one or both of the outer surfaces of the multi-layer films may be surface-treated to increase the surface energy to render the film receptive to, e.g., metallization, coatings, printing inks, lamination, and combinations thereof. The surface treatment can be carried out according to any of the methods known in the art including corona discharge, flame, plasma, chemical treatment, or treatment by a polarized flame.

Metallization

In some embodiments, one or both of the outer surfaces (or heat seal layers) of the multi-layer film structure may be metallized. Such layers may be metallized using conventional techniques, such as vacuum metallization by deposition of a metal layer such as aluminum, copper, silver, chromium, or mixtures thereof.

Coating

In some embodiments, one or more coatings, such as for barrier, printing, and/or processing, is applied to one or both of the outer surfaces of the multi-layer film structures. Such coatings include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings can be applied by known techniques, such as by an emulsion coating technique, co-extrusion, and/or lamination.

The PVdC coatings that are suitable for use with the multi-layer films are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177.

Known vinyl alcohol-based coatings, such as PVOH and EVOH, that are suitable for use with the multi-layer films include Vinol™ 125 or Vinol™ 325 (both commercially available from Air Products, Inc. of Allentown, Pa.). Other PVOH coatings are described in U.S. Pat. No. 5,230,963.

Before applying the coating composition to the appropriate substrate, the outer surface of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, and the like. Corona discharge is an electronic treatment method that includes exposing the film surface to a high voltage corona discharge while passing the film between a pair of spaced electrodes. After treatment of the film surface, the coating composition is then applied thereto.

An intermediate primer coating may be applied to the multi-layer films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy and poly(ethylene imine) (PEI) materials. U.S. Pat. Nos. 3,753,769, 4,058,645, and 4,439,493 disclose the use and application of such primers. The primer provides an overall adhesively active surface for thorough and secure bonding with the subsequently applied coating composition and can be applied to the film by conventional solution coating techniques, for example, by roller application.

The coating composition can be applied to the film as a solution, for example, one prepared with an organic solvent such as an alcohol, ketone, or ester. However, since the coating composition can contain insoluble, finely divided inorganic materials that may be difficult to keep well dispersed in organic solvents, the coating composition be applied to the treated surface in any convenient manner, such as by gravure coating, roll, coating, dipping, and spraying. The excess aqueous solution can be removed by, e.g., squeeze rolls and doctor knives.

In some embodiments, the film can be stretched in the MD, coated with the coating composition, and then stretched perpendicular in the TD. In yet another embodiment, the coating can be carried out after biaxial orientation is completed.

The coating composition may be applied in such an amount that there will be deposited upon drying a smooth, evenly distributed layer. The coating may be dried by hot air, radiant heat, or by any other convenient technique. Coatings may have coating weights ranging from about 0.5 g/m² to about 1.6 g/m² for conventional PVOH coatings, from about 0.78 g/m² to about 2.33 g/m² for conventional acrylic and low temperature seal coatings (LTSC), and from about 1.6 g/m² to about 6.2 g/m² for conventional PVdC coatings.

melt flow rate of 7 g/10 min (ASTM D1238), a density of 0.90 g/cm³ (ASTM D1505), and a tensile strength at break of 35.9 MPa (ASTM D638).

F800E™ is a random copolymer polypropylene commercially available from Sinopec, Shanghai, having a melt flow rate of 8 g/10 min.

Cast films can be prepared using a pilot scale commercial cast film line machine as follows. Pellets of the polymeric blend are melted at temperatures ranging from about 150° C. to about 230° C., with the specific melt temperature being chosen to match melt viscosities of the various resins. The melts are conveyed to a coextrusion adapter that combines the melt flows into a multilayer, coextruded structure. This layered flow is distributed through a single manifold film extrusion die to the desired width. The die gap opening is typically about 0.6 mm to about 1 mm. The material is then drawn down to the final gauge. The material draw down ratio is typically about 21:1 for films of about 50 μm. A vacuum box or air knife can be used to pin the melt exiting the die opening to a primary chill roll maintained at about 20° C.

Example heat-seal film formulations and process conditions for forming the example heat-seal films are provided in Table 1.

Examples 2-4 are comparatives, while examples 1 and 5-11 represent inventive films.

TABLE 1

Heat-Seal Film Formulations and Process Parameters for the Cast Lines

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Vistamaxx ™ 3588 | 100 | 0 | 0 | 0 | 80 | 80 | 50 | 30 | 50 | 30 | 0 |
| Vistamaxx ™ 3980 | 0 | 0 | 0 | 0 | 0 | 0 | 0 | 0 | 0 | 0 | 50 |
| FL7641 (terPP) | 0 | 100 | 0 | 0 | 0 | 0 | 0 | 0 | 0 | 0 | 0 |
| PP2822E1 (hPP) | 0 | 0 | 100 | 0 | 20 | 0 | 50 | 70 | 0 | 0 | 50 |
| F800E | 0 | 0 | 0 | 100 | 0 | 20 | 0 | 0 | 50 | 70 | 0 |
| Temperatures | set/actual | set/actual | set/actual | set/actual | set/actual | set/actual | set/actual | set/actual | set/actual | set/actual | set/actual |
| Zone 1 (° C.) | 150/150 | 160/160 | 160/160 | 160/160 | 150/150 | 160/160 | 180/180 | 180/180 | 160/160 | 160/160 | 180/180 |
| Zone 2 (° C.) | 170/170 | 230/230 | 205/205 | 200/200 | 180/180 | 190/190 | 230/230 | 230/230 | 210/210 | 210/210 | 230/230 |
| Zone 3 (° C.) | 190/190 | 230/230 | 205/205 | 200/200 | 200/200 | 190/190 | 230/230 | 230/230 | 210/210 | 210/210 | 230/230 |
| Zone 4 (° C.) | 190/190 | 225/225 | 205/205 | 200/200 | 200/200 | 190/190 | 225/225 | 225/225 | 210/210 | 210/210 | 225/225 |
| Adapter 1 (° C.) | 190/190 | 225/225 | 240/240 | 230/230 | 200/200 | 215/215 | 225/225 | 225/225 | 220/220 | 220/220 | 225/225 |
| Swivel 1 (° C.) | 195/198 | 225/227 | 245/247 | 235/235 | 205/206 | 225/225 | 225/225 | 225/223 | 220/220 | 220/223 | 225/223 |
| Swivel 2 (° C.) | 195/193 | 225/225 | 245/245 | 235/234 | 205/206 | 225/225 | 225/225 | 225/226 | 220/220 | 220/219 | 225/223 |
| Adapter 2 (° C.) | 190/190 | 225/225 | 245/245 | 235/235 | 200/200 | 225/225 | 225/225 | 225/225 | 220/220 | 220/220 | 225/225 |
| Die 1 (° C.) | 191/191 | 230/228 | 245/246 | 238/237 | 200/200 | 228/228 | 225/226 | 225/225 | 220/220 | 220/219 | 225/222 |
| Die 2 (° C.) | 190/190 | 230/230 | 245/245 | 235/234 | 200/200 | 225/225 | 225/225 | 225/225 | 220/220 | 220/220 | 225/224 |
| Die 3 (° C.) | 191/191 | 230/229 | 245/246 | 238/237 | 200/200 | 228/228 | 225/225 | 225/224 | 220/220 | 220/219 | 225/221 |
| Die Gap (mm) | 1 | 1 | 1 | 1 | 1 | 1 | 1 | 1 | 1 | 1 | 1 |
| Chill Roll (° C.) | 15 | 50 | 25 | 25 | 15 | 25 | 20 | 20 | 15 | 15 | 20 |
| Thickness (μm) | 50 ± 10% | 50 ± 10% | 50 ± 10% | 50 ± 10% | 50 ± 10% | 50 ± 10% | 50 ± 10% | 50 ± 10% | 50 ± 10% | 50 ± 10% | 50 ± 10% |

EXAMPLES

Materials

Vistamaxx™ 3588 and Vistamaxx™ 3980 are commercially available from ExxonMobil Chemical Co, having properties shown above in Table A.

FL7641™ is a polypropylene terpolymer commercially available from The Polyolefin Company, Singapore. It has a melt flow rate of 7 g/10 min (ASTM D1238), a density of 0.90 g/cm³ (ASTM D792), a tensile strength at break of 44 MPa (ASTM D638), and an elongation at break of 900% (ASTM D638).

PP2822E1™ is a polypropylene homopolymer commercially available from ExxonMobil Chemical Co, having a Measured properties of example heat-seal films are provided in Table 2 and Table 3.

As used herein, "seal strength" refers to the force to separate two layers in accordance with ASTM F-88 which is incorporated by references. For example, this is the force necessary to separate two layers of a defined width, such as one inch or 15 mm, by pulling.

The seal strength (N/15 mm) is measured herein based on ASTM F88 using a Zwick Tensile Tester pulled at 90° angle from the seal at a speed of 500 mm/min after samples with a width of 15 mm are conditioned in the constant temperature lab for at least 40 hours at a temperature of 23° C.±2° C. and at a relative humidity of 50%±10%, which method is specifically developed by Applicant based on ASTM F88 and is herein referred to as "EMC method".

HTIT=Hot Tack Initiation Temperature, which is the temperature at which seal strength is 1 N/25.4 mm, was measured according to ASTM F1921. Seal initiation temperature is the temperature at which the seal strength was 200 g/25.4 mm.

For seal strength and hot tack test methods, the film samples were conditioned at about 23° C.±2° C. and about 50%±5% relative humidity for at least 40 hours.

Hot tack was measured Hot tack was measured according to ASTM F1921 as follows. Sample after back taped is at least conditioned at 23±2° C. and relative humidity of 50±10% for 40 hrs. Sample Width: 30±0.5 mm Specimen minimum length: 300 mm Maximum thickness: 0.5 mm A tape roller was used to apply laminating pressure to the tape strips, anchoring them firmly to the sample specimen. Taped samples were then precision cut in the MD, across the web, with a dedicated 30 mm sample strip cutter. Hot tack was measured using a J&B Hot Tack Tester 4000 using the following conditions: seal pressure=0.5 N/mm$^2$, seal time=0.5 seconds, cool (delay) time=0.4 seconds, peel speed=200 mm/s, and sample width=30 mm. The values reported are the average of four measurements.

DSC was measured according to ASTM D3418 as follows: Melting temperature ($T_m$) and heat of fusion ("$H_f$") are measured using Differential Scanning calorimetry (DSC). This analysis is conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. The sample was then held at 25° C. for 10 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition were analyzed for onset of transition and peak temperature. The melting temperatures reported herein are the peak melting temperatures from the second heat unless otherwise indicated. For polymers displaying multiple peaks, the higher melting peak temperature is reported.

Examples 1-6 were tested by ACD lab non-iso thermal DSC. Test procedure is: Hold for 5 min at −50° C.; Heat from −50° C. to 200° C. at 10° C./min; Hold for 5 min at 200° C.; Cool from 200° C. to −50° C. at 10° C./min; Hold for 5 min at −50° C.; Heat from −50° C. to 200° C. at 10° C./min; Hold for 1 min at 200° C.

Examples 7-11 were tested based on ASTM D3418. Test procedure is: Hold for 10 min at 200° C.; Cool from 200° C. to 25° C. at 10° C./min; Hold for 10 min at 25° C.; Heat from 25° C. to 200° C. at 10° C./min.

TABLE 2

Results of Seal Strength and Hot Tack Tests at Various Temperatures

| | 70° C. | 80° C. | 90° C. | 100° C. | 110° C. | 120° C. | 130° C. | 140° C. | 150° C. | 160° C. | 170° C. | 180° C. |
|---|---|---|---|---|---|---|---|---|---|---|---|---|
| Seal Strength (Fmax) N/15 mm | | | | | | | | | | | | |
| Ex. 1 | — | — | 0.9 | 13.7 | 13.7 | 14.4 | 11.9 | 11.7 | — | — | — | — |
| Ex. 2 | — | — | — | — | — | — | 1.0 | 18.0 | 17.7 | 18.3 | 19.7 | 17.4 |
| Ex. 3 | — | — | — | — | — | — | 0.7 | 3.6 | 15.6 | 24.2 | 25.3 | 23.0 |
| Ex. 4 | — | — | — | — | — | 0.5 | 5.2 | 23.0 | 19.7 | 17.9 | 20.5 | — |
| Ex. 5 | — | — | — | 0.5 | 0.7 | 1.5 | 10.8 | 13.4 | 10.0 | 10.1 | — | — |
| Ex. 6 | — | — | — | — | 0.8 | 8.4 | 12.7 | 14.3 | 13.3 | 12.9 | — | — |
| Ex. 7 | — | — | — | — | 1.2 | 2.1 | 2.7 | 14.0 | 21.7 | 23.2 | 18.4 | — |
| Ex. 8 | — | — | — | — | 1.0 | 1.3 | 2.6 | 5.5 | 20.9 | 20.9 | 27.0 | — |
| Ex. 9 | — | — | — | — | 1.8 | 2.2 | 17.3 | 19.0 | 20.7 | 18.3 | 20.0 | — |
| Ex. 10 | — | — | — | — | 1.5 | 2.9 | 12.1 | 22.9 | 24.7 | 23.9 | 25.9 | — |
| Ex. 11 | — | — | — | — | 1.0 | 1.4 | 1.5 | 7.6 | 20.4 | 20.7 | 20.9 | — |
| Hot Tack Force (Fmax) N/30 mm | | | | | | | | | | | | |
| Ex. 1 | 0.49 | 2.67 | 4.64 | 8.48 | 11.20 | 8.57 | 7.16 | 5.93 | 4.23 | 3.14 | — | — |
| Ex. 2 | — | 0.12 | 0.10 | 0.12 | 0.10 | 1.59 | 16.20 | 3.59 | 2.84 | 2.48 | — | — |
| Ex. 3 | — | — | 0.11 | 0.08 | 0.23 | 0.82 | 2.29 | 5.80 | 8.98 | 4.00 | 3.05 | 2.72 |
| Ex. 4 | — | — | 0.21 | 1.04 | 2.88 | 4.74 | 12.90 | 5.14 | 3.77 | 3.46 | — | — |
| Ex. 5 | — | 0.77 | 1.71 | 3.06 | 6.02 | 15.30 | 12.60 | 7.65 | 5.83 | 4.66 | — | — |
| Ex. 6 | — | 0.84 | 2.48 | 3.65 | 5.39 | 12.10 | 7.97 | 6.29 | 4.43 | 3.38 | — | — |
| Ex. 7 | — | — | — | 0.81 | 1.83 | 2.71 | 3.95 | 8.47 | 17.98 | 5.28 | — | — |
| Ex. 8 | — | — | — | 0.42 | 1.27 | 2.13 | 2.86 | 7.64 | 5.55 | 3.81 | — | — |
| Ex. 9 | — | — | 0.84 | 2.40 | 3.20 | 4.55 | 12.17 | 6.52 | 5.20 | — | — | — |
| Ex. 10 | — | — | 0.24 | 1.73 | 2.58 | 3.72 | 15.40 | 5.81 | 4.96 | — | — | — |
| Ex. 11 | — | — | — | 0.93 | 1.51 | 2.49 | 4.76 | 19.84 | 5.22 | — | — | — |

Approximate values. Heat seal strength and hot tack force are measured in Newtons (N).

TABLE 3

Heat Seal Film Properties

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| DSC Onset $T_m$ (° C.) | 96.8 | 140.3 | 156.7 | 137.2 | 148.9 | 72.0 | 109.6 | 112.4 | 103.7 | 112.8 | — |
| DSC Peak $T_m$ (° C.) | 106.6 | 148.5 | 162.1 | 144.5 | 160.1 | 104.1 | 163.6 | 164.9 | 151.2 | 153.2 | 164.6 |

Approximate values.

The data in the tables highlight lower seal initiation temperature (SIT) with seal strength increased simultaneously when Vistamaxx™ elastomers were used in a films with hPP or RCP relative to the terpolymer polypropylene (terPP) (around 7° C.-10° C. lower than 100% terPP formulation at 10N seal force). Thus, Vistamaxx blending with hPP or RCP formulations in the films can achieve lower SIT with simultaneously very high seal strength.

The data illustrate that films of Vistamaxx™ elastomers with hPP or RCP can achieve a higher seal strength plateau (approx. 5%-37%) than the 100% terPP formulation. Moreover, the films of Vistamaxx™ elastomers with hPP or RCP show a broader hot tack window with seal strength increased simultaneously (around 28%-84% broader than 100% terPP formulation at 5N seal force).

FIGS. 1A (regular view) and 1B (enlarged view) are graphs illustrating seal strength at various temperatures. The results show that, in general, the seal force plateau of the Vistamaxx™ films with hPP or RCP is higher than conventional films using 100% terPP. For example, at a 140° C. sealing temperature, the film of 30% Vistamaxx™ 3588 and RCP (Example 10) achieves about 27.2% higher seal strength than 100% terPP. Furthermore, at 10N seal force, the film of Vistamaxx™ 3588 and RCP can also achieve a SIT of about 7° C. lower than 100% terPP.

Figure 2A:
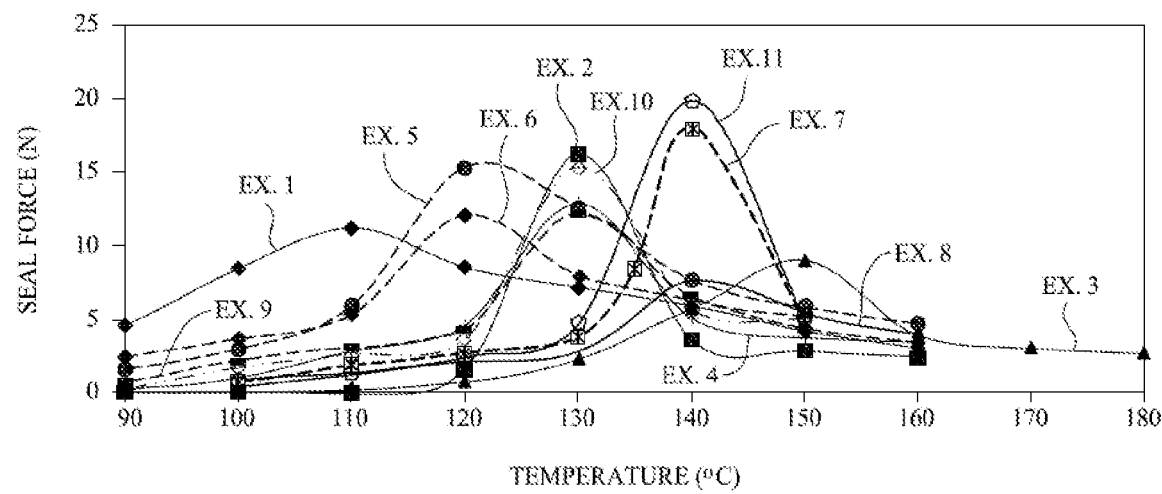
FIG. 2A is a graph illustrating the hot tack force for the example cast films according to some embodiments.
Figure 2B:
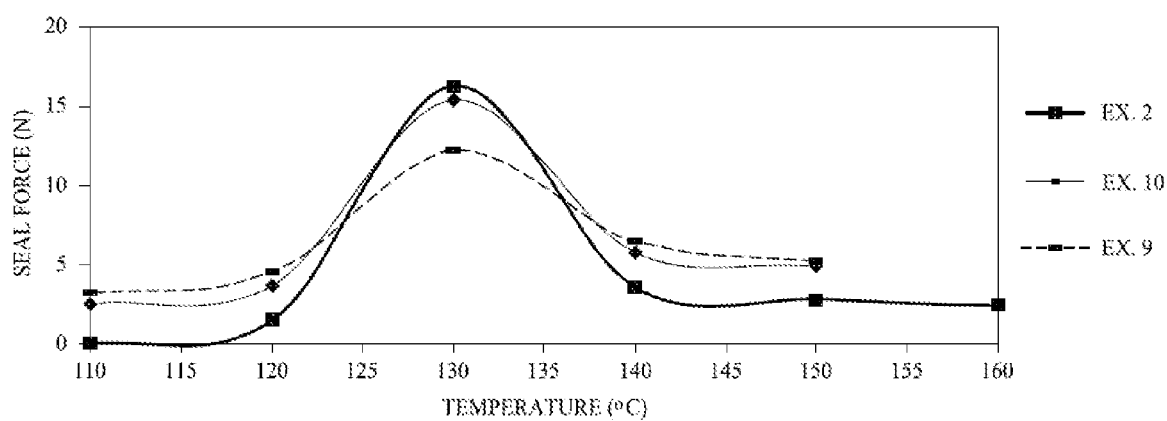
FIG. 2B are graphs illustrating the hot tack force for the example cast films according to some embodiments.

FIGS. 2A (regular view) and 2B (enlarged view) are graphs illustrating hot tack results of the various formulations.

FIG. 3 shows that the hot tack window of the novel films (e.g., examples 5, 9 and 10) is broader than conventional films. For example, the film of 50% Vistamaxx™ 3588 and RCP (Example 9) and the film of 30% Vistamaxx™ 3588 and RCP (Example 10) have a broader hot tack window and a higher seal strength plateau than the film of 100% terPP.

The examples show very robust sealing performance. That is, low SIT, broad seal window, broad hot tack window, and very high seal strengths. According to the data, the novel films outperform the conventional terpolymer films.

The foregoing examples were based on the use of various grades of Vistamaxx™ specialty elastomers as the second polymer component of the heat-seal layer. It will be understood by persons skilled in the art that similar results would be expected if other similar polymers (e.g., Tafmer™ elastomers from Mitsui Chemicals, Versify™ elastomers from Dow Chemical Company, and certain grades of Softel™ from Basell Polyolefins, Netherlands.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A heat-seal film comprising:
from 10 wt % to 90 wt % of a first polymer component and from 10 wt % to 90 wt % of a second polymer component, based on a total weight of the first polymer component and the second polymer component, wherein:
the first polymer component comprises propylene, and optionally, up to 18 wt % of ethylene and/or a $C_4$-$C_{20}$ α-olefin based on a total weight of the first polymer component, wherein the first polymer component has a melt flow rate (2.16 kg @ 230° C., ASTM D1238) of from 1 g/10 min to about 30 g/10 min; and
the second polymer component comprises from 91 wt % to 99.9 wt % of propylene and from 0.1 wt % to 9 wt % of ethylene based on a total weight of the second polymer component, the second copolymer component having a melt flow rate (2.16 kg @ 230° C., ASTM D1238) of from 2 dg/min to 60 dg/min, a MWD of from about 1 to about 5, a heat of fusion (as measured by DSC) of about 75 J/g or less, a triad tacticity as measured by $^{13}C$ NMR of about 75% or greater, a melting point (as measured by DSC) of about 105° C. or less, a tensile strength at break (ASTM D638) of 17.2 MPa or more, an elongation at break (ASTM D638) of 1750% or less, and a 1% secant flexural modulus (ASTM D790) of 65 MPa or more, and wherein the heat-seal film has a seal initiation temperature that is 125° C. or less and a peak melting point that is 180° C. or less.

2. The heat seal film of claim 1 comprising:
from 20 wt % to 70 wt % of a first polymer component and from 30 wt % to 80 wt % of a second polymer component, based on a total weight of the first polymer component and the second polymer component, wherein:
the first polymer component comprises propylene, and optionally, up to 4 wt % of a $C_2$ and/or a $C_4$-$C_{20}$ α-olefin based on a total weight of the first polymer component; and
the second polymer component comprises from 91 wt % to 99 wt % of propylene and from 1 wt % to 9 wt % of ethylene based on a total weight of the second polymer component, the second copolymer component having a melt flow rate (2.16 kg @ 230° C., ASTM D1238) of from 8 g/10 min to 60 g/10 min.

3. The heat-seal film of claim 1, wherein the first polymer component comprises propylene and from 1 wt % to 4 wt % of a $C_2$ and/or a $C_4$-$C_{20}$ α-olefin.

4. The heat-seal film of claim 1, wherein the first polymer component is a polypropylene homopolymer having a melt flow rate (2.16 kg @ 230° C., ASTM D1238) of 3 g/10 min to 20 g/10 min.

5. The heat-seal film of claim 1, wherein the second polymer component comprises from 4 wt % to 9 wt % ethylene based on the total weight of the second polymer component.

6. The heat-seal film of claim 1, wherein the second polymer component has a density of from 0.85 g/cm³ to 0.9 g/cm³ (23° C., ASTM D1505).

7. The heat-seal film of claim 1, wherein the second polymer component has a weight average molecular weight of from 100,000 g/mol to 500,000 g/mol.

8. The heat-seal film of claim 1, wherein the heat seal film has a seal initiation temperature that is from about 7° C. to about 10° C. lower than a 100% terPP formulation, at a seal force of 10N.

9. The heat-seal film of claim 1, wherein the heat seal film has:
a seal strength plateau that is from about 5% to about 37% higher than a 100% terPP formulation; and
a hot tack window (ASTM F1921) that is from about 28% to about 84% larger than a 100% terPP formulation at a seal force of 5N.

10. A heat seal film comprising:
from 50 wt % to 70 wt % of a first polymer component and from 30 wt % to 50 wt % of a second polymer component, based on a total weight of the first polymer component and the second polymer component, wherein:
the first polymer component comprises propylene, and optionally up to 10 wt % of ethylene and/or up to 10 wt % of a $C_4$-$C_{20}$ α-olefin based on a total weight of the first polymer component, wherein the first polymer component has a melt flow rate (2.16 kg @ 230° C., ASTM D1238) of from 1 g/10 min to about 30 g/10 min; and
the second polymer component comprises from 91 wt % to 99.9 wt % of propylene and from 0.1 wt % to 9 wt % of ethylene based on a total weight of the second polymer component, the second copolymer component having:
a melt flow rate (2.16 kg @ 230° C., ASTM D1238) of from 2 g/10 min to 60 g/10 min,
a density of from 0.85 g/cm³ to 0.9 g/cm³ (23° C., ASTM D1505),
a weight average molecular weight of from 100,000 g/mol to 500,000 g/mol,
a MWD of from about 1 to about 5,
a heat of fusion (as measured by DSC) of about 75 J/g or less, a triad tacticity as measured by $^{13}C$ NMR of about 75% or greater,
and a melting point (as measured by DSC) of about 105° C. or less,
wherein the heat-seal film has a seal initiation temperature that is 125° C. or less and a peak melting point that is 180° C. or less, wherein the heat-seal film has a seal initiation temperature that is from about 7° C. to about 10° C. lower than a 100% terPP formulation, at a seal force of 10N.

11. The heat seal film of claim 10, wherein:
the first polymer component comprises propylene, and up to 4 wt % of ethylene and/or up to 10 wt % of a $C_4$-$C_{20}$ α-olefin based on a total weight of the first polymer component; and
the second polymer component comprises from 91 wt % to 99 wt % of propylene and from 1 wt % to 9 wt % of ethylene based on a total weight of the second polymer component, the second copolymer component having:
a melt flow rate (2.16 kg @ 230° C., ASTM D1238) of 8 g/10 min to 60 g/10 min,
a density of from 0.875 g/cm³ to 0.89 g/cm³ (23° C., ASTM D1505).

12. The heat-seal film of claim 10, wherein the first polymer component comprises propylene and from 1 wt % to 4 wt % of ethylene and/or a $C_4$-$C_{20}$ α-olefin.

13. The heat-seal film of claim 10, wherein the first polymer component has a melt flow rate of 3 g/10 min to 20 g/10 min.

14. The heat-seal film of claim 1, wherein the first polymer component is a polypropylene homopolymer, having a melt flow rate (2.16 kg @ 230° C., ASTM D1238) of 3 g/10 min to 20 g/10 min.

15. The heat-seal film of claim 10, wherein the second polymer component comprises from 4 wt % to 9 wt % ethylene based on the total weight of the second polymer component.

16. The heat-seal film of claim 15, wherein the second polymer component has:
a tensile strength at break (ASTM D638) of 17.2 MPa or more;
an elongation at break (ASTM D638) of 1750% or less; and
a 1% secant flexural modulus (ASTM D790) of 65 MPa or more.

17. The heat-seal film of claim 1, wherein the heat seal film has:
a seal strength plateau that is from about 5% to about 37% higher than a 100% terPP formulation; and
a hot tack window (ASTM F1921) that is from about 28% to about 84% larger than a 100% terPP formulation at a seal force of 5N.

18. A multi-layer film structure comprising:
a heat-seal layer comprising the heat-seal film of claim 1; and
an unoriented, an uniaxially oriented, or a biaxially oriented base layer comprising polypropylene homopolymer, a polypropylene random copolymer, or a combination thereof.

* * * * *